(12) United States Patent
Nishizawa

(10) Patent No.: US 7,232,155 B2
(45) Date of Patent: Jun. 19, 2007

(54) SEATBELT APPARATUS

(75) Inventor: Muneo Nishizawa, Ohmihachiman (JP)

(73) Assignee: Takata Corporation, Tokyo (JP)

( * ) Notice: Subject to any disclaimer, the term of this patent is extended or adjusted under 35 U.S.C. 154(b) by 568 days.

(21) Appl. No.: 10/118,027

(22) Filed: Apr. 9, 2002

(65) Prior Publication Data

US 2002/0149191 A1 Oct. 17, 2002

(30) Foreign Application Priority Data

Apr. 12, 2001 (JP) ............................. 2001-113787

(51) Int. Cl.
  B60R 22/28 (2006.01)
  B60R 22/46 (2006.01)
(52) U.S. Cl. ....................................... 280/805; 280/806
(58) Field of Classification Search ................ 280/805, 280/806, 807; 180/268; 188/371, 376, 377; B60R 22/36, B60R 22/46
See application file for complete search history.

(56) References Cited

U.S. PATENT DOCUMENTS

| | | | |
|---|---|---|---|
| 3,822,915 A * | 7/1974 | Colucci | 297/478 |
| 3,973,650 A * | 8/1976 | Nagazumi | 188/371 |
| 4,008,909 A * | 2/1977 | Otani et al. | 297/470 |
| 5,431,447 A * | 7/1995 | Bauer | 280/805 |
| 5,529,343 A * | 6/1996 | Klink | 280/805 |
| 5,531,479 A * | 7/1996 | Bauer | 280/806 |
| 5,533,756 A * | 7/1996 | Dybro et al. | 280/806 |
| 5,725,249 A | 3/1998 | Nishide et al. | 280/806 |
| 5,788,280 A * | 8/1998 | Ohsumi | 280/805 |
| 6,056,320 A | 5/2000 | Khalifa et al. | 280/805 |
| 6,139,111 A * | 10/2000 | Pywell et al. | 297/484 |
| 6,179,330 B1 | 1/2001 | Wier | 280/806 |
| 6,238,003 B1 * | 5/2001 | Miller et al. | 297/480 |
| 6,409,217 B1 * | 6/2002 | Denis | 280/806 |
| 6,447,011 B1 * | 9/2002 | Vollimer | 280/806 |

FOREIGN PATENT DOCUMENTS

| JP | 10181529 A | * | 7/1998 |
|---|---|---|---|
| JP | 11129864 A | * | 5/1999 |
| JP | 2001219815 A | * | 8/2001 |

* cited by examiner

*Primary Examiner*—Paul N. Dickson
*Assistant Examiner*—Laura B. Freedman
(74) *Attorney, Agent, or Firm*—Foley and Lardner LLP

(57) ABSTRACT

A seatbelt apparatus with two pretensioners and a load limiter. The seatbelt apparatus has a seatbelt retractor, a belt guide, a lap belt anchor, a tongue, and a buckle. The seatbelt retractor and the lap belt anchor are provided with pretensioners. The buckle is fixed to an inner portion of a car body such as the car floor through a load limiter. This configuration allows the seatbelt apparatus to restrain a passenger more effectively.

9 Claims, 1 Drawing Sheet

SEATBELT APPARATUS

BACKGROUND

The present invention relates to a seatbelt apparatus disposed at a seat of a vehicle such as an automobile for restraining and thus protecting a passenger during an emergency such as when a car crashes.

A known seatbelt apparatus is typically fixed to portions of a car body close to a car seat. The seatbelt apparatus comprises a seatbelt for restraining a passenger while he/she wears the seatbelt and which fixed to the lap belt anchor mounted on the outer side in the compartment of the car body at the end of the seatbelt, a seatbelt retractor for retracting and extracting the seatbelt during a non-emergency operation and for preventing the extraction of the seatbelt during an emergency such as when a car crashes and thus restraining and protecting the passenger, a buckle fixed to, for example, a portion of the inner side in the compartment of the car body, and a tongue which is slidably mounted on the seat belt and which can engage with the buckle. The passenger wears the seatbelt by engaging the tongue with the buckle so as to extend the seatbelt across his/her shoulder, chest, and pelvis.

While the passenger wears the seatbelt, the seatbelt retractor rolls up the seatbelt retractable and in a relatively slack manner so as to allow the seatbelt to fit to the passenger to such an extent that the passenger feels free during non-emergency operation. In addition, even though the force of inertia caused by the large deceleration of a car which takes place during an emergency such as when a car crashes pushes the passenger forward, the seatbelt retractor prevents the seatbelt from being extracted, thereby allowing the seatbelt to restrain and thus protect the passenger.

Some known seatbelt apparatuses have a pretensioner for quickly restraining the passenger with a large restraining force by tightening the seatbelt and thus improving the restraint performance of the seatbelt during an emergency such as when a car crashes. Although the pretensioners are generally disposed at the seatbelt retractor, some of the pretensioners are disposed at a portion of the car body at the inner side of the compartment in which the buckle is provided or at the lap belt anchor. An exemplary typical pretensioner disposed at the seatbelt retractor is constructed such that, during an emergency such as when a car crashes, a reactant material reacts to produce a high-pressure reactant gas, thus allowing a spool of the seatbelt retractor to rotate in the retracting direction of the seatbelt.

Also, because the passenger is subject to a large impact when a large load is exerted on the seatbelt during an emergency such as when a car crashes, some known seatbelt apparatuses have a load limiter to limit this load exerted on the seatbelt to a predetermined level. This load limiter allows the seatbelt to pay out by limiting the load to a predetermined level. Moreover, the typical load limiter is integrated into the seatbelt retractor since it is often preferable that the seatbelt securely restrains the pelvis of the passenger. The typical load limiter integrated into the seatbelt retractor has a torsion bar disposed coaxially with and extending through a center hole of the spool of the seatbelt retractor. The torsion bar is twisted by a pull-out force of the seatbelt during an emergency such as when a car crashes, allowing the load limiter to absorb shock energy during the emergency and thus to limit the load exerted on the seatbelt to a predetermined level.

Alternatively, some load limiters are disposed at the lap belt anchor. The load limiter may include a worked piece, which is connected to the lap belt anchor and which is disposed at a cylinder containing a piston. When the seat belt is withdrawn from its retracted position due to the force applied by the occupant during an emergency, the worked piece is cut by a cutting blade of the piston connected to the seatbelt, thus allowing the load limiter to absorb shock energy during the emergency which may occur when a car crashes. As a result, the load limiter limits the load exerted on the seatbelt to a predetermined level.

In recent years, a seatbelt apparatus has been required not only to merely have improved seatbelt restraint, but also to have greater technical advantages and advanced capabilities of the seatbelt for effectively restraining and thus protecting a passenger, in addition to having the improved restraint, without inflicting a large shock on the passenger owing to the increase of rigidity of a car body and the like.

SUMMARY OF THE INVENTION

To meet the above requirements, a seatbelt apparatus in which two pretensioners and a load limiter are used in combination is provided. In one embodiment of the seatbelt apparatus, the load limiter is integrated into a seatbelt retractor because it is preferable for the seatbelt to securely restrain the pelvis of the passenger as described above. Furthermore, one of the two pretensioners is disposed at the seatbelt retractor so as to effectively produce the foregoing effect of the pretensioner. However, such a configuration in which the pretensioner and the load limiter are both disposed at the seatbelt retractor gives rise to problems of not only a larger sized seatbelt retractor but also difficulties in achieving greater technical advantages and advanced capabilities of the seatbelt apparatus.

In view of these problems, one object of the present invention is to provide a seatbelt apparatus in which the size of a seatbelt retractor can be reduced even when two pretensioners and a load limiter are used in combination, and which has greater technical advantages and advanced capabilities.

According to an embodiment of the invention a seatbelt apparatus is provided. The apparatus comprises a seatbelt retractor fixed to a portion of a car body such as the floor; a lap belt anchor which is fixed to a portion in the direction of an outer side in the compartment of the car body and which is connected to the end of a seatbelt extending from the seatbelt retractor; a tongue slidably mounted on the seatbelt; and a buckle which is fixed to a portion in the direction of an inner side in the compartment of the car body and which can engage with the tongue. Furthermore, the seatbelt apparatus comprises a first pretensioner for applying tension on the seatbelt during an emergency such as car collision; a second pretensioner for applying tension on the seatbelt during the emergency; and a load limiter disposed at the buckle for limiting a load exerted on the seatbelt during the emergency to a predetermined level.

With the above configuration as described above, the seatbelt apparatus according to the present invention has the first and second pretensioners disposed at the seatbelt retractor and the lap belt anchor, respectively, allowing the two pretensioners to directly apply tension on the seatbelt, and thus allowing the seatbelt to restrain the pelvis of a passenger most effectively.

Since the seatbelt effectively restrains the passenger by disposing the two pretensioners, respectively, at the seatbelt retractor and the lap belt anchor, the load limiter can be disposed at the buckle that affects the restraining of the pelvis of the occupant. Moreover, the load limiter can be disposed so as to be separated from the pretensioners.

As described above, disposing the two pretensioners, respectively, at the seatbelt retractor and the lap belt anchor, and disposing the load limiter at the buckle in the inner side in the compartment of the car body in combination allows the seatbelt to restrain the passenger more effectively.

In addition, disposing the load limiter to be separated from the pretensioner prevents the seatbelt retractor and the lap belt anchor from becoming larger and also increases the versatilities of design features of both the pretensioners and the load limiter. With these features, the respective mechanism and the controls of the pretensioners and the load limiter can be easily designed and arranged corresponding to a driver's body, the speed at a crash, the seat position, and so on, in consideration of the respective characteristics, thus resulting in effectively and easily achieving greater technical advantages and advanced capabilities of the seatbelt apparatus.

It is to be understood that both the foregoing general description and the following detailed description are exemplary and explanatory only, and are not restrictive of the invention as claimed.

BRIEF DESCRIPTION OF THE DRAWINGS

These and other features, aspects and advantages of the present invention will become apparent from the following description, appended claims, and the accompanying exemplary embodiments shown in the drawing, which is briefly described below.

DETAILED DESCRIPTION

Figure 1:
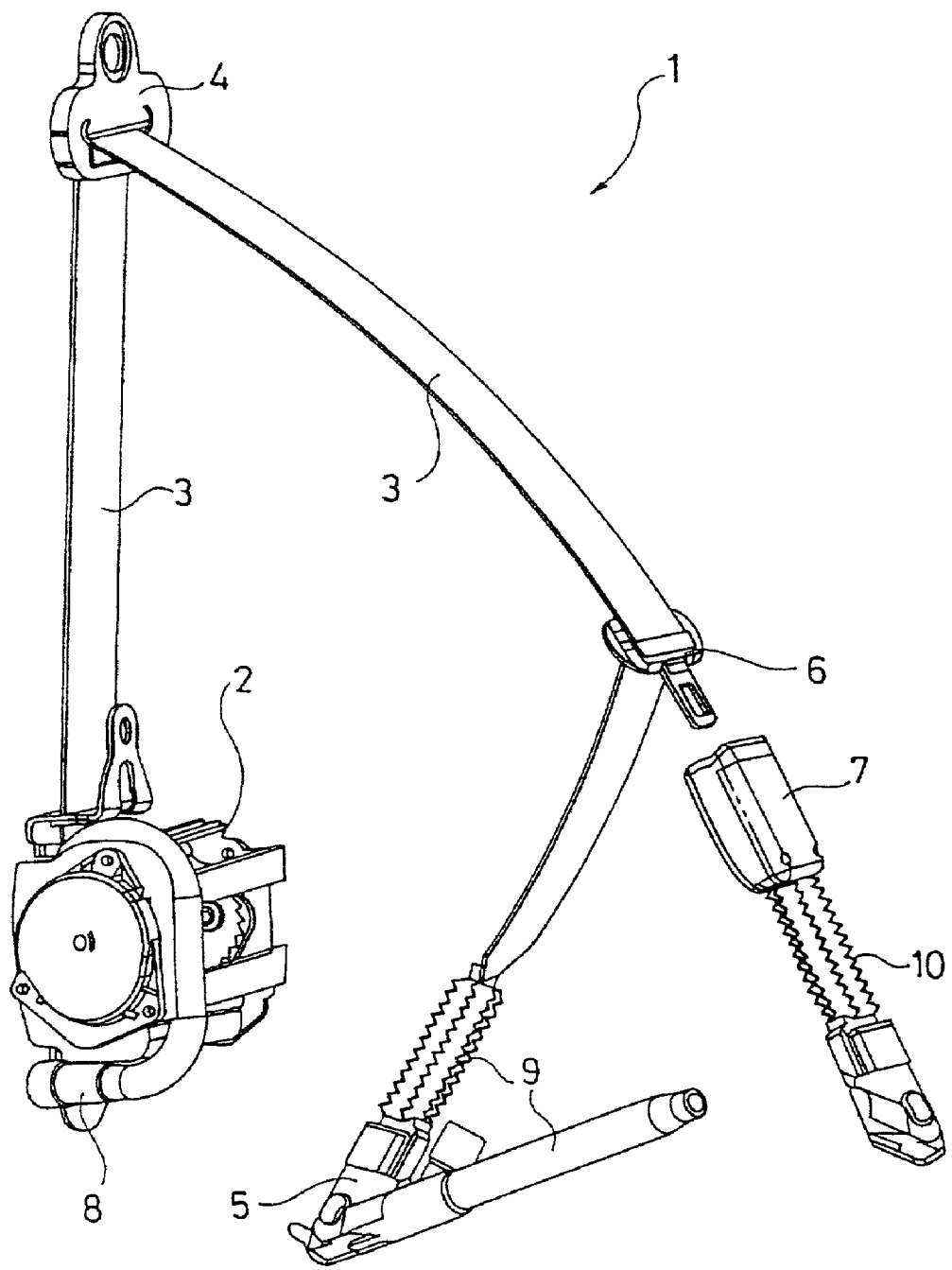
FIG. 1 is a schematic illustration of an exemplary seatbelt apparatus according to an embodiment of the present invention.

The present invention will be described with an embodiment below. FIG. 1 is a schematic view of an exemplary embodiment of a seatbelt apparatus according to the present invention.

As shown in FIG. 1, a seatbelt apparatus 1 according to the embodiment of the present invention includes a seatbelt retractor 2. The retractor 2 may be fixed to a car body at the floor or similar location. The apparatus 1 also includes a belt guide 4 that may be fixed to the car body at, for example, a center pillar. The belt guide 4 guides a seatbelt 3 that extends from the seatbelt retractor 2 so that the seatbelt extends over a passenger in a predetermined position. The apparatus also includes a lap belt anchor 5 which is fixed to the car body at, for example, a portion of the car floor. In an alternative embodiment, the lap belt anchor 5 may be fixed to the outer side of a car seat (not shown). The lap belt anchor 5 is connected to the end of the seatbelt 3. The apparatus further includes a tongue 6 slideably mounted on the seatbelt 3, and a buckle 7 which is fixed to the car body. The tongue 6 and the buckle 7 are configured to be engaged. The buckle 7 may be fixed to a portion of the car floor, for example. In another embodiment, the buckle 7 may be fixed at the inner side of the car seat.

The seatbelt retractor 2 is an emergency locking type seatbelt retractor with a pretensioner 8 but without a load limiter (referred to as an ELR with a pretensioner). The pretensioner 8 (the "first pretensioner") may be of a type such that, during an emergency such as when a car crashes, a reactant material produces a high-pressure gas, thus allowing a spool of the seatbelt retractor 2 to rotate in the roll-up direction of the seatbelt, as described previously. However, in alternative embodiments of the present invention other known pretensioners can be employed.

The lap belt anchor 5 also includes a pretensioner 9 (the "second pretensioner"). The second pretensioner 9 may be of a type such that, during an emergency such as when a car crashes, a reactant material reacts to produce a high-pressure reactant gas, thus allowing the seatbelt 3 to be pulled toward the lap belt anchor 5. However, in alternative embodiments of the present invention other known pretensioner can be employed in the lap belt anchor. For example, a pretensioner similar to the buckle pretensioner disclosed in U.S. Pat. No. 5,725,249 (incorporated by reference herein in its entirety) may be provided, however, the scope of the present invention is not limited to the pretensioner disclosed in the cited patent. The pretensioner may include a compressible cover as shown in FIG. 1.

The buckle 7 is preferably fixed to the portion of the car floor at the inner side of the seat with respect to the car body or to the seat through a load limiter 10. Conventional load limiters may be employed with the apparatus 1 of the present invention. The load limiter 10 may be a smart load limiter which changes a load by an electrical signal, or the like. A simple example of a suitable load limiter is a limiter formed by pattern sewing. The webbing is sewn in layers stitched together. The stitching breaks when a predetermined load is applied. The webbing may be covered by a compressible cover as shown in FIG. 1. Other load limiters may also be employed such as, for example, the load limiter disclosed in U.S. Pat. No. 6,056,320 (incorporated by reference herein in its entirety). However, the scope of the present invention is not limited and includes any suitable load limiter.

In the seatbelt apparatus 1 according to the embodiment configured as described above, disposing the two pretensioners, respectively, at the seatbelt retractor 2 and the lap belt anchor 5 allows the two pretensioners to directly apply tension on the seatbelt 3 when the pretensioners are activated during an emergency such as when a car crashes, and thus the seatbelt 3 restrains the pelvis of a passenger most effectively.

Disposing the two pretensioners at the seatbelt retractor 2 and the lap belt anchor 5, respectively, allows the load limiter 10 to be disposed at the buckle 7 which lies in an inner portion of the car body, and thus the load limiter 10 can be disposed so that the load limiter 10 is separated from the pretensioners 8 and 9.

A combined configuration of disposing the two pretensioners, respectively, at the seatbelt retractor 2 and the lap belt anchor 5 and also disposing the load limiter 10 at the buckle 7 allows a passenger to be restrained more effectively. With the foregoing combined configuration, the seatbelt apparatus 1 according to the embodiment effectively improves the restraint on the passenger, even when the load limiter 10 is not provided at the seatbelt retractor 2.

Disposing the first and second pretensioners 8, 9 at locations separate from the load limiter 10 reduces the size of both the seatbelt retractor 2 and the lap belt anchor 5. As a result, the versatilities of design features of both the pretensioners 8, 9 and the load limiter 10 are increased. As a result, the respective mechanism and the controls of the pretensioners 8 and 9 and the load limiter 10 can be easily designed and arranged corresponding to a driver's body, the speed at a crash, the seat position, and so on, in consideration of the respective characteristics, thus resulting in effectively and easily achieving greater technical advantages and advanced capabilities of the seatbelt apparatus.

As will be appreciated from the foregoing description, because a seatbelt apparatus according to the present invention has first and second pretensioners disposed at a seatbelt retractor and a lap belt anchor, respectively, the two pretensioners can directly apply tension on a seatbelt during an emergency such as when a car crashes. More particularly, a portion of the seatbelt, to which the activated first pretensioner disposed at the seatbelt retractor directly applies tension most effectively, restrains the upper body, for example, the shoulders and the chest of a passenger, and also another portion of the seatbelt, to which the activated second pretensioner disposed at the lap belt anchor directly applies tension most effectively, restrains the pelvis of the passenger. Furthermore, because the activated second pretensioner most effectively restrains the pelvis of the passenger during an emergency, the seatbelt is fitted to the pelvis during non-emergency operation in the same slack manner in which the seatbelt is fitted to the upper body, for example, the shoulders and the chest of the passenger. Accordingly, this makes the passenger feel an increased comfort when he/she wears the seatbelt during non-emergency operation.

Disposing the two pretensioners, respectively, at the seatbelt retractor and the lap belt anchor allows a load limiter to be disposed at a buckle which lies in an inner portion of the car body, and thus the load limiter can be disposed so that the load limiter is separated from the pretensioners.

A combined configuration of disposing the two pretensioners, respectively, at the seatbelt retractor and the lap belt anchor and also disposing the load limiter at the buckle allows the passenger to be restrained more effectively. With the foregoing combined configuration, the seatbelt apparatus according to the embodiment effectively improves the restraint on the passenger, even when the load limiter is not disposed at the seatbelt retractor.

The priority document, Japanese Patent Application No. 2001-113787 filed Apr. 12, 2001, is incorporated by reference herein in its entirety.

Disposing the pretensioners to be separated from the load limiter prevents both the seatbelt retractor and the lap belt anchor from becoming large and increases the versatilities of design features of both the pretensioners and the load limiter. With these features, the respective mechanism and the controls of the pretensioners and the load limiter can be easily designed and arranged corresponding to a driver's body, the speed at a crash, the seat position, and so on, in consideration of the respective characteristics, thus resulting in effectively and easily achieving greater technical advantages and advanced capabilities of the seatbelt apparatus.

What is claimed is:

1. A three point seat belt apparatus comprising:
   a three point webbing comprising three points;
   a first pretensioner is mounted directly on a first one of the three points;
   a second pretensioner is mounted directly on a second one of the three points; and
   a load limiter connected to a third one of the three points, wherein no pretensioners are connected to the third one of the three points.

2. The apparatus of claim 1, further comprising:
   a lap belt anchor which is fixed to an outer side of a compartment of a car body and which is connected to the first one of the three points;
   a tongue slidably mounted on the webbing; and
   a buckle which is fixed to an inner side of the compartment of the car body, which can engage with the tongue, and which is connected to the third one of the three points,
   wherein a seatbelt retractor fixed to the car body includes the second pretensioner.

3. The apparatus of claim 1, wherein the first one of the three points is connected to a lap portion of the webbing,
   wherein the second one of the three points is connected to a shoulder portion of the webbing;
   wherein a retractor includes the second pretensioner for retracting the shoulder portion of the webbing; and
   wherein an anchor is connected to the second one of the three points.

4. The apparatus of claim 3, further comprising a buckle connected to the load limiter.

5. The apparatus of claim 4, wherein the buckle is configured to engage a tongue connected to the webbing.

6. A seatbelt apparatus comprising:
   a seatbelt retractor fixed to a car body;
   a lap belt anchor which is fixed to an outer side of a compartment of the car body and which is connected to an end of a seatbelt extending from the seatbelt retractor;
   a tongue slidably mounted on the seatbelt;
   a buckle which is fixed to an inner side of the compartment of the car body and which can engage with the tongue, wherein the buckle is not directly connected to a pretensioner for applying tension on the seatbelt during an emergency;
   a first pretensioner mounted on the lap belt anchor for applying tension on the seatbelt during the emergency;
   a second pretensioner mounted on the retractor for applying tension on the seatbelt during the emergency; and
   a load limiter disposed at the buckle for limiting a load exerted on the seatbelt during the emergency to a predetermined level.

7. A safety apparatus for an occupant of a vehicle comprising:
   a seat belt having a shoulder portion and a lap portion;
   a plurality of pretensioners comprising at least a first pretensioner and a second pretensioner;
   a retractor for retracting the shoulder portion of the seat belt, the retractor including the first pretensioner;
   an anchor for securing the lap portion to the vehicle, the anchor including the second pretensioner; and
   a load limiter for limiting the load applied to the occupant by the seat belt, wherein the load limiter is positioned away from all pretensioners of the plurality of pretensioners.

8. The apparatus of claim 7, further comprising a buckle connected to the load limiter.

9. The apparatus of claim 8, wherein the buckle is configured to engage a tongue connected to the seat belt.

* * * * *